(12) United States Patent
Kashif (10) Patent No.: US 12,232,914 B2
(45) Date of Patent: Feb. 25, 2025

(54) FLOSSING DEVICE

(71) Applicant: Hassan Kashif, Harrington Park, NJ (US)

(72) Inventor: Hassan Kashif, Harrington Park, NJ (US)

(*) Notice: Subject to any disclaimer, the term of this patent is extended or adjusted under 35 U.S.C. 154(b) by 526 days.

(21) Appl. No.: 17/383,367

(22) Filed: Jul. 22, 2021

(65) Prior Publication Data

US 2022/0023018 A1    Jan. 27, 2022

Related U.S. Application Data (60) Provisional application No. 63/055,358, filed on Jul. 23, 2020.

(51) Int. Cl.
  *A61C 15/00* (2006.01)
  *A61C 15/04* (2006.01)
(52) U.S. Cl.
  CPC .................. *A61C 15/046* (2013.01)

(58) Field of Classification Search
  CPC ....... A61C 15/00; A61C 15/04; A61C 15/045; A61C 15/046
  See application file for complete search history.

(56) References Cited

U.S. PATENT DOCUMENTS

| | | | |
|---|---|---|---|
| 5,022,417 A | 6/1991 | Cimini | |
| 5,190,062 A | 3/1993 | Rafaeli | |
| 5,429,145 A | 7/1995 | Bral | |
| 8,091,567 B2 | 1/2012 | Toor | |
| 2012/0318289 A1* | 12/2012 | Sahoo | A61C 15/046 132/200 |
| 2013/0220356 A1 | 8/2013 | Sahoo | |
| 2014/0230843 A1 | 8/2014 | Achour | |

OTHER PUBLICATIONS

Blizzbrush, About Us, https://blizzbrush.com/pages/about-us.

* cited by examiner

*Primary Examiner* — Rachel R Steitz
(74) *Attorney, Agent, or Firm* — Gearhart Law, LLC (57) ABSTRACT

A dental floss appliance comprising a U-shaped frame; a plurality of movable fasteners held by the frame; and a plurality of dental floss sections strung between the fasteners.

16 Claims, 11 Drawing Sheets

FLOSSING DEVICE

CROSS REFERENCE TO RELATED APPLICATION

This application claims priority of U.S. Provisional Application No. 63/055,358, filed Jul. 23, 2020, which is hereby incorporated by reference in its entirety as if fully set forth herein.

FIELD OF THE INVENTION

The present invention relates generally to the field of dental hygiene, and in particular to flossing between teeth.

BACKGROUND

Flossing contributes to good dental hygiene by removing plaque and food in between teeth. Brushing also removes plaque and food debris, but the bristles of a toothbrush can't reach very far in between teeth to remove all the debris, as flossing can. Therefore, flossing helps keep the mouth as free from debris as possible. Many types of flossing devices and techniques exist in the prior art.

U.S. Pat. No. 5,190,062 teaches a dental flosser that holds a plurality of threads especially spaced for insertion between teeth of a particular user for whom the flosser is custom made.

U.S. Patent Publication No. 2013/0220356 teaches a method and device for flossing teeth utilizing positionally adjustable floss picks holding strands of dental floss. The floss picks fit into a retainer component and are positioned to insert the floss strands into the interproximal dental spaces between the user's teeth. The position of individual floss picks can be adjusted to achieve the correct fit. The disclosure also teaches a retainer with two sides comprising slotted tracks extending substantially the length of each retainer side. The slots contain floss strands.

U.S. Pat. No. 8,091,567 teaches a custom-designed oral appliance for simultaneously flossing all the user's teeth, consisting of a custom-fitted polymer mouthpiece containing two corresponding holes located at the gum line between adjacent teeth, wherein one hole is located on the lingual side and another hole is located on the buccal side of the appliance. Common floss is then threaded through the appliance such that it matches the individual user's teeth pattern. New floss can be dispensed through the appliance and spent floss collected by means of a floss distribution system. A further embodiment provides a cross flossing pattern to maximize floss contact with the interproximal surfaces of adjacent teeth.

U.S. Pat. No. 5,022,417 teaches an individualizable flossing mouthpiece for simultaneously flossing a plurality of spaces between adjacent pairs of a person's teeth is a channel shaped member with an outer wall portion, and inner wall portion having free edges and a gap therebetween. The mouthpiece can receive a set of teeth in the gap. The wall portions have outer and inner series of closely spaced slots to receive dental floss therein. The distance between adjacent ones of the slots is less than the average tooth width, and dental floss can be trapped in selected ones of the slots. The material of the channel shaped member is such that it can receive and permanently retain markings identifying certain ones of the slots in the outer wall portion. The mouthpiece can be individualized by placing the same in the person's mouth with the person's teeth in the gap and identifying those slots (less than all) in the outer wall portion corresponding to the edges of the person's teeth. An individualized flossing mouthpiece assembly adds dental floss to the individualized flossing mouthpiece, the floss extending through each so identified slot and across the gap to and through the corresponding slot in the inner wall portion. The individualized assembly is used by placing same in the person's mouth with the pre-placed floss between the person's teeth and moving the mouthpiece.

U.S. Patent Publication No. 2014/0230843 teaches a multi-tooth flosser allows a user to floss simultaneously several spaces between the user's teeth. In an embodiment, the device includes an assembly of multiple pieces, allowing the device to be adjustable and adapted to the mouths of different users. The user adjusts the placement of the stringed material through movement of floss receivers along an arched groove, with the dental floss being attached to the floss receivers. In this way, the stringed material is aligned with the positions of the spaces between the user's teeth. An impression of the user's teeth made in a cavity filled with impressionable material into which the user bites guides the adjustment of the floss receivers.

U.S. Pat. No. 5,429,145 teaches a custom made mouthpiece for individual patients, used for flossing and/or brushing the interproximal areas between two or more teeth in a dental arch which has as an option, a gum massaging device to massage the gums either simultaneously or not simultaneously with brushing and/or flossing of interproximal areas.

SUMMARY

A dental floss appliance comprising a U-shaped frame; a plurality of movable fasteners held by the frame; and a plurality of dental floss sections strung between the fasteners.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate disclosed embodiments and/or aspects and, together with the description, serve to explain the principles of the invention, the scope of which is determined by the claims.

In the drawings.

DETAILED DESCRIPTION

It is to be understood that the figures and descriptions provided herein may have been simplified to illustrate aspects that are relevant for a clear understanding of the herein described processes, machines, manufactures, and/or compositions of matter, while eliminating, for the purpose of clarity, other aspects that may be found in typical devices, systems, and methods. Those of ordinary skill in the pertinent art may recognize that other elements and/or steps may be desirable and/or necessary to implement the devices, systems, and methods described herein. Because such elements and steps are well known in the art, and because they do not facilitate a better understanding of the present disclosure, a discussion of such elements and steps may not be provided herein. However, the present disclosure is deemed to inherently include all such elements, variations, and modifications to the described aspects that would be known to those of ordinary skill in the pertinent art.

It will be readily understood by one having ordinary skill in the relevant art that the components of the present invention, as generally described and illustrated in the figures herein, may be realized in a variety of different configurations. Thus, the following detailed description of embodiments of a method, apparatus, and system, as represented in the attached figures, is not intended to limit the scope of the invention as claimed, but is merely representative of selected illustrative embodiments of the invention. The usage of the phrases "example embodiments", "some embodiments", or other similar language, throughout this specification refers to the fact that a particular feature, structure, or characteristic described in connection with the embodiment may be included in at least one embodiment of the present invention, and do not necessarily all refer to the same group of embodiments.

Further, it will readily be understood that the present disclosure has broad utility and application. Any embodiment may incorporate only one or a plurality of the aspects described in the disclosure, and may incorporate only one or a plurality of the disclosed features. Furthermore, any embodiment discussed and identified as being "preferred" is considered to be part of a best mode contemplated for realizing the invention. Other embodiments may be described for additional illustrative purposes in providing a full and enabling disclosure. Moreover, other embodiments, such as adaptations, variations, modifications, and equivalent arrangements, are deemed to be implicitly disclosed by the embodiments described herein and to fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description makes reference to the accompanying drawings. In general, the same reference numbers are used in the drawings and the description to refer to the same or similar elements. While many embodiments and aspects are described in the disclosure, modifications, adaptations, and other implementations are possible that fall within the scope of the claims. For example, substitutions, additions, or modifications may be made to the elements and arrangements described and illustrated in the drawings, and the methods described herein may be modified by substituting, reordering, or adding steps to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting the subjected matter disclosed under them.

Figure 1:
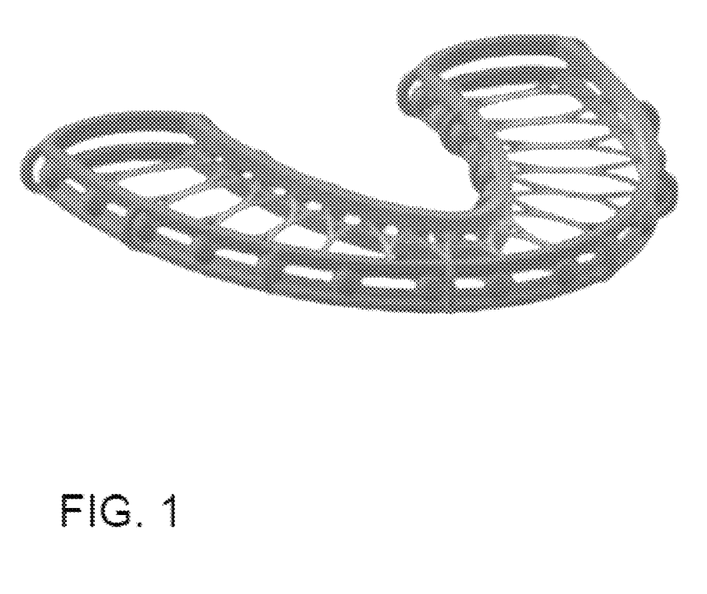
FIG. 1 is an illustration of an embodiment in accordance with the disclosure.

Turning now to FIG. 1, an exemplary embodiment of the present invention is shown in the form of a U-shaped appliance or device. The appliance comprises a frame having an inner wall and an outer wall, held firmly together by a contiguous wall end piece at each end. A network of dental floss is strung between the inner and outer walls. The frame can be made from any of a variety of materials, for example a moldable thick flexible material such as sodium alginate or polyvinylsiloxane, plastic, resin or any other appropriately strong and flexible material which can form an impression of teeth and be inserted into the mouth for a period of time. The appliance may be molded to a user's upper or lower teeth to adapt the appliance to the individual. However in a preferred embodiment, the presence of beads coupled to the floss strands such that the beads move within slots in the frame to adjust the position of the floss strands allows for the appliance to fit securely onto virtually any individual's set of teeth.

The network of dental floss may comprise nylon, cotton, silk, or similar natural or artificial threads made from multiple fibers twisted together. A thread comprising such fibers may preferably have 2.5-3.5 twists per inch to create one much stronger strand or thread. In embodiments, the network is configured in a crisscross pattern of threads spaced apart within the U-shaped frame. The spacing of the threads corresponds to the spacing of the user's lower or upper set of teeth. The threads are coupled to one side of the appliance through open spaces in the walls. The threads are looped, tied, or otherwise coupled to fasteners such as movable hooks, beads, or the like, which are disposed along the outside perimeter of the walls, adjacent to the open spaces in the walls. In embodiments, the fasteners may be disposed located within indented grooves or tracks disposed along the outside perimeter of the walls of the U-shaped frame. This allows the movable fasteners to roll or slide along the indented grooves or tracks. The movable fasteners allow the appliance to adapt to any user's mouth, with any configuration of teeth, to guide the threads between the teeth. The movable fasteners also allow a user to move the threads after the appliance is placed on their teeth, using one or more of their fingers, their tongue, or some other device, such as an external pick-like device configured to move the fasteners and adjust the threads after the appliance is placed in the mouth. In use the threads remain taut, and can withstand the tension caused when the appliance is placed in the mouth and the threads are being inserted or removed from between the user's teeth.

Figure 2A:
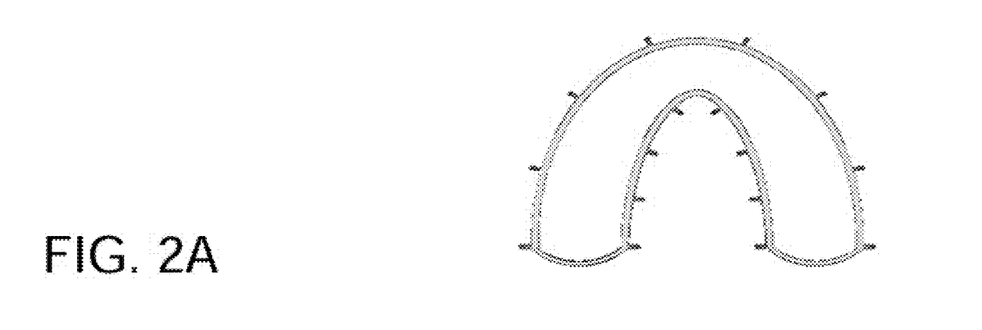
FIGS. 2A, 2B, and 2C are simplified illustrations of a U-shaped frame, an assembled appliance, and a network of dental floss sections, respectively, in accordance with the disclosure.
Figure 2B:
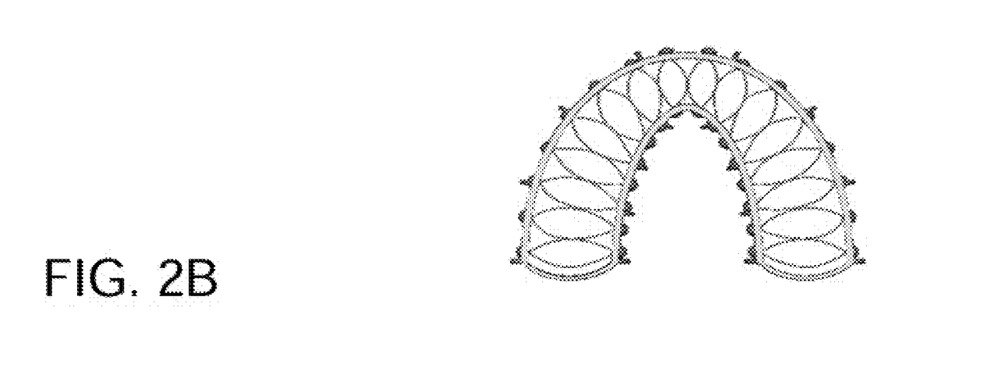
Figure 2C:
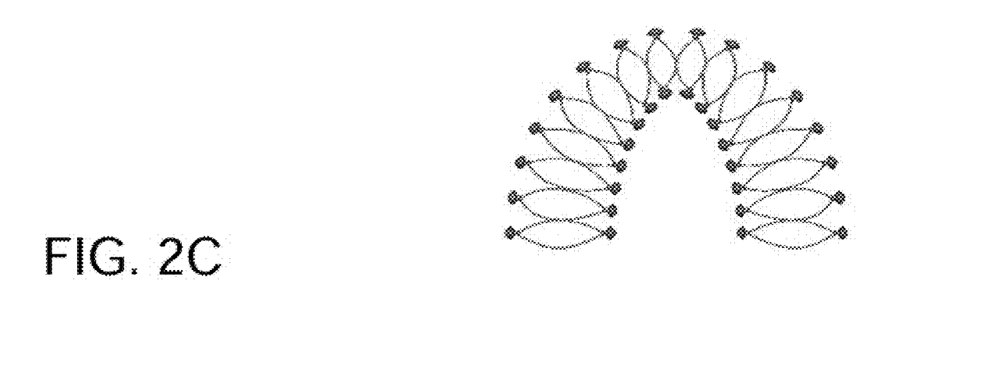

FIGS. 2A-2C show an illustrative simplified embodiment. As shown in the figures, the appliance comprises a frame (FIG. 2A), and a network of threads (FIG. 2C) that fit inside the frame (FIG. 2B) to form a flossing appliance. Each thread is able to move to adapt to a particular user's mouth. There are 16 pairs of fasteners such as hooks, holes, or the like, each pair comprising one fastener on the outside perimeter of the frame (2A) and a corresponding hook on the inside perimeter of the frame. The fasteners are disposed such that when the appliance is threaded properly (FIG. 2B), each section of the threads is disposed approximately between respective adjacent ones of a user's set of teeth, plus a thread adjacent to the outside surface of the tooth at each end of the set of teeth. In use, the fasteners may be self-adjusting to allow the thread sections to conform to the user's teeth, such that the thread sections are positioned to slide against every lateral surface of each of all 16 teeth of the upper or lower set of teeth.

In an exemplary operation, the appliance may be pressed against a user's upper set or lower set of teeth, thereby inserting floss sections into the joints or spaces between the teeth. When the appliance is removed the threads lift and remove food or other particles that may be present between the user's teeth. The user does not have to maneuver the floss sections to dig between their teeth like traditional flossing devices and techniques. Rather, because both sides of every interproximal space or joint between each pair of adjacent teeth are fully enclosed by simply inserting and then removing the frame threaded with floss (FIG. 2B), the interproximal spaces may be freed of debris in a single operation, although repeated application of the appliance if desired does not harm the teeth or the appliance. Further, if desired a user may move the frame in forward and back and/or side to side motions for continued cleaning, particularly in cases where the user has gaps or is missing certain teeth, or if the gum surface is not straight. In embodiments, the appliance may be configured to have an attachment (not shown) by which a user can more easily inert and remove the appliance from the user's teeth. In embodiments, the appliance may be used a single time and then discarded, or may be used multiple times until the threads wear out. In the case an appliance is used multiple times, even without changing the floss, the appliance prevents cross contamination because each time the appliance is used, the same thread is going into the same interproximal area for cleaning. In contrast, conventional floss, floss picks, and other products in the market may cause cross contamination because the same floss portion is used to clean a plurality of different interproximal areas. Accordingly, when a floss portion is inserted into an interproximal area that harbors an unhealthful condition such as bacteria, the floss becomes contaminated and may spread the contamination to subsequently flossed interproximal areas between other pairs of teeth.

Floss Frame 1

Figure 3:
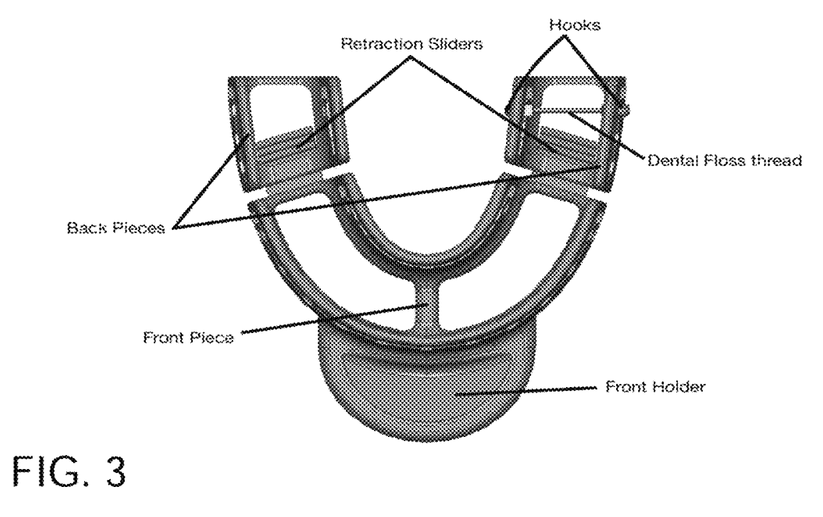
FIGS. 3, 4A-4B, 5A-5B, 6A-6B, 7, 8, 9, 10, 11, 12, 13, and 14 are illustrations of exemplary embodiments in accordance with the disclosure.

The embodiment illustrated in FIG. 3 comprises three pieces—a front piece and two detachable back pieces having retraction sliders. The two detachable back pieces can be slid onto and off of the sliders. One of the back pieces is disposed on the left side and one on the right side when the appliance is in use. There are a total of 16 slots in the three pieces when assembled, through which dental floss may be threaded and coupled to fasteners disposed along the outer perimeter. In embodiments, a front holder may extend from the front of the frame, to be held by a user when inserting and removing the appliance. Further as previously described, a user may move the frame in forward and back and/or side to side motions for continued cleaning, particularly in cases where the user has gaps or is missing certain teeth, or if the gum surface isn't straight.

Floss Frame 2

Figure 4A:
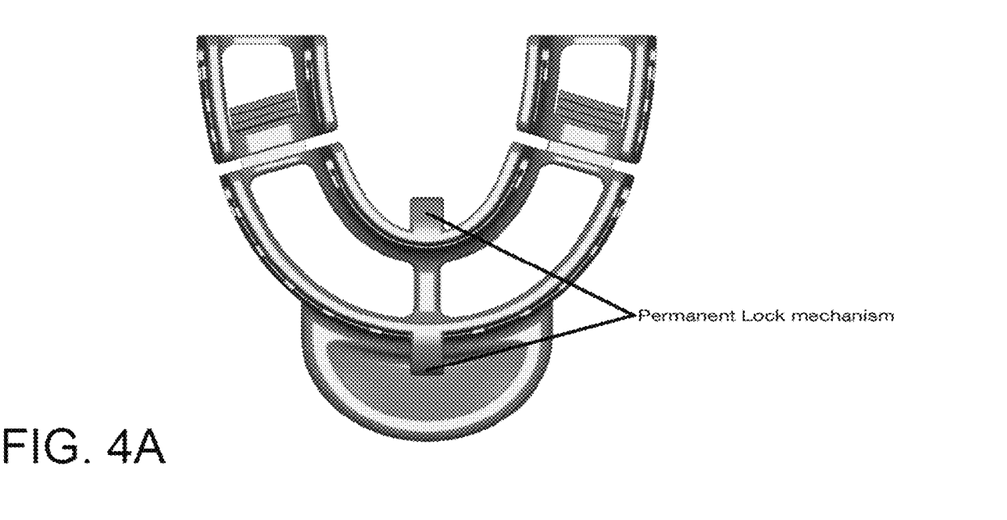
Figure 4B:
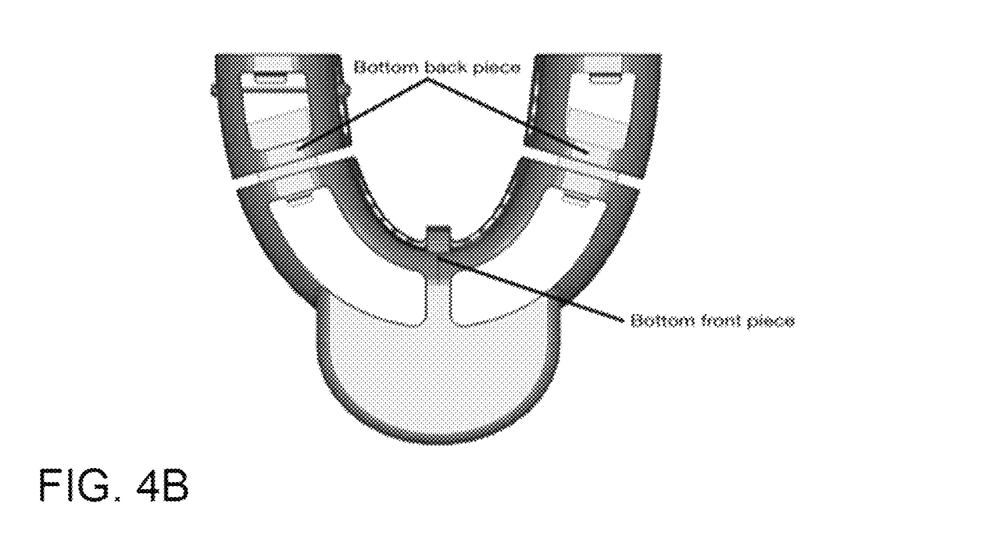

The embodiment illustrated in FIGS. 4A and 4B is similar to that of FIG. 3, except this embodiment comprises upper (4A) and lower (4B) parts that couple together. The upper and lower parts both comprise an arch-shaped front piece having two ends, and two rear pieces, coupled to the ends of the front piece. In embodiments, the rear pieces each have latch parts that engage matching latch parts disposed on the ends of the front piece. Each of the three upper pieces has a protrusion that snaps onto indentations in the corresponding bottom piece. The upper front piece also comprises a permanently closed lock mechanism on each of its front wall and its back wall, to keep the rear pieces locked in position relative to the front piece. This lock mechanism ensures the thread network remains taut, even though the thread fasteners are still able to move within the grooves or tracks in the walls of the front piece and the rear pieces to adjust the attached threads' positions to match the interproximal locations between the user's teeth. Because the lock mechanism in the front piece is permanently closed, the floss is locked in place and cannot be replaced, making this embodiment appropriate for use as a disposable flossing appliance that may be discarded after one use.

Floss Frame 3

Figure 5A:
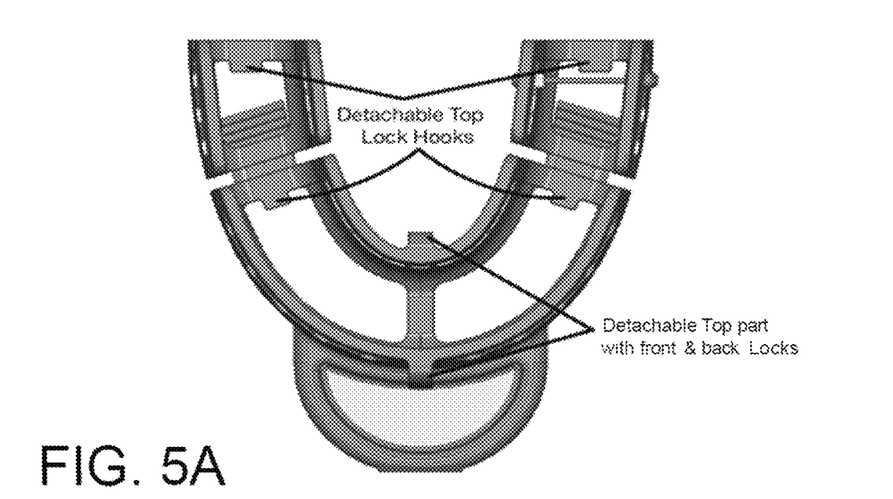
Figure 5B:
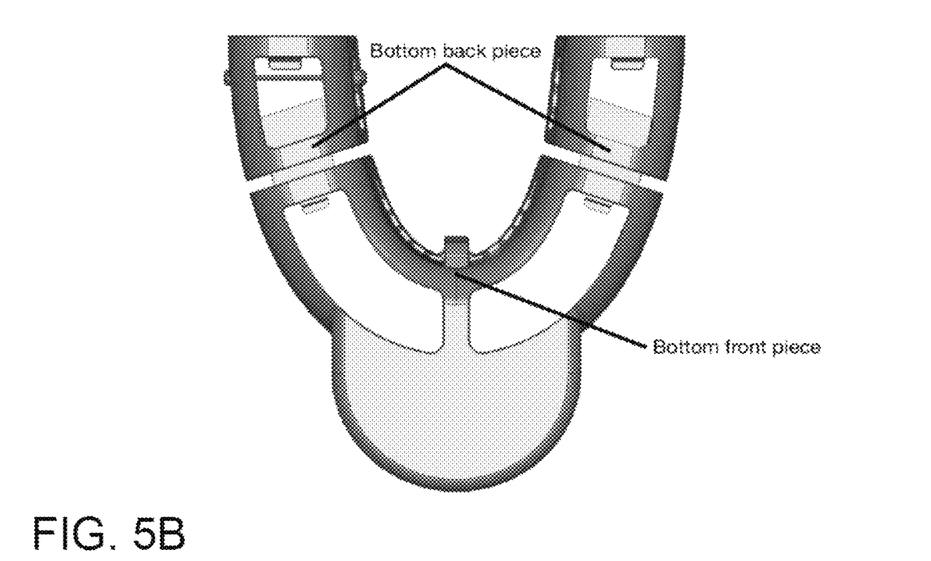

The embodiment illustrated in FIGS. 5A and 5B are similar to that shown in FIGS. 4A and 4B, respectively. This embodiment also includes upper (5A) and lower (5B) parts that couple together. Each part has one piece in front and two in the rear, one of the rear pieces coupled to the rear left and the other to the rear right of the front piece. The back pieces have latch parts that engage matching latch parts disposed on the ends of the front piece. Each of the three upper pieces has a protrusion that snaps onto an indentation in the corresponding bottom piece. In this embodiment, the upper front piece comprises a detachable lock mechanism on each of its front and back walls, configured so the user can take the appliance out of the mouth after use, detach the locks and replace the floss, and use the appliance again, making this embodiment appropriate for use as a flossing appliance that may be refreshed with new floss and reused.

Floss Frame 4

Figure 6A:
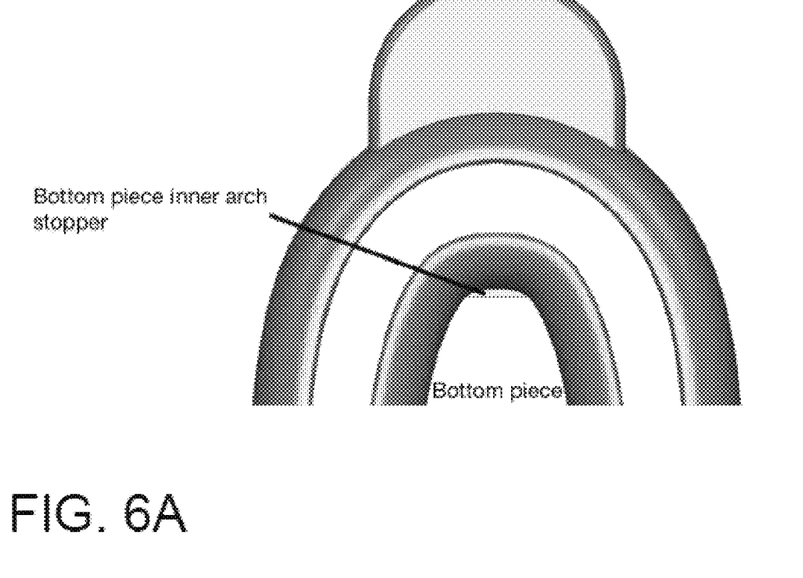
Figure 6B:
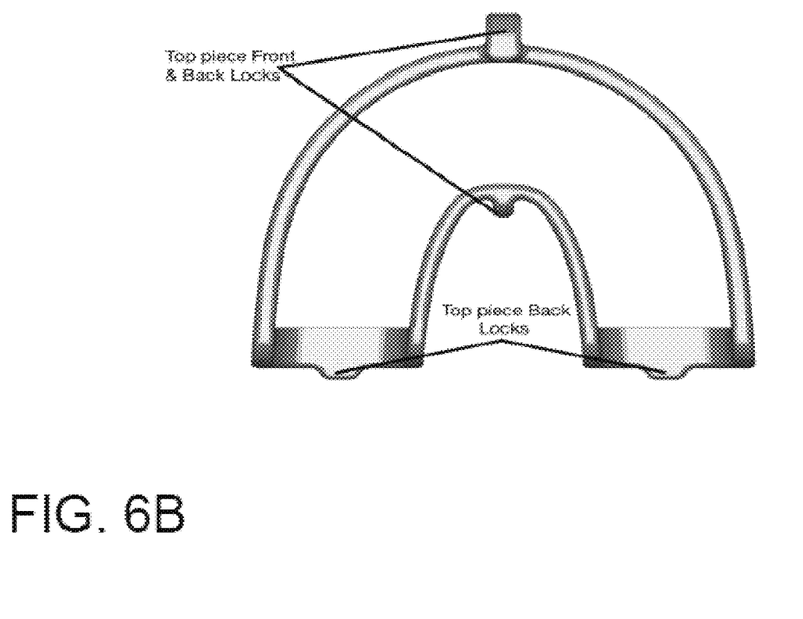

The embodiment of a frame illustrated in FIGS. 6A, 6B also comprises a top piece and a bottom piece, respectively. This embodiment has a total of four protrusions extending from the top piece that engage respective indentations in the bottom piece.

Mix Thread Design Frame

Figure 7:
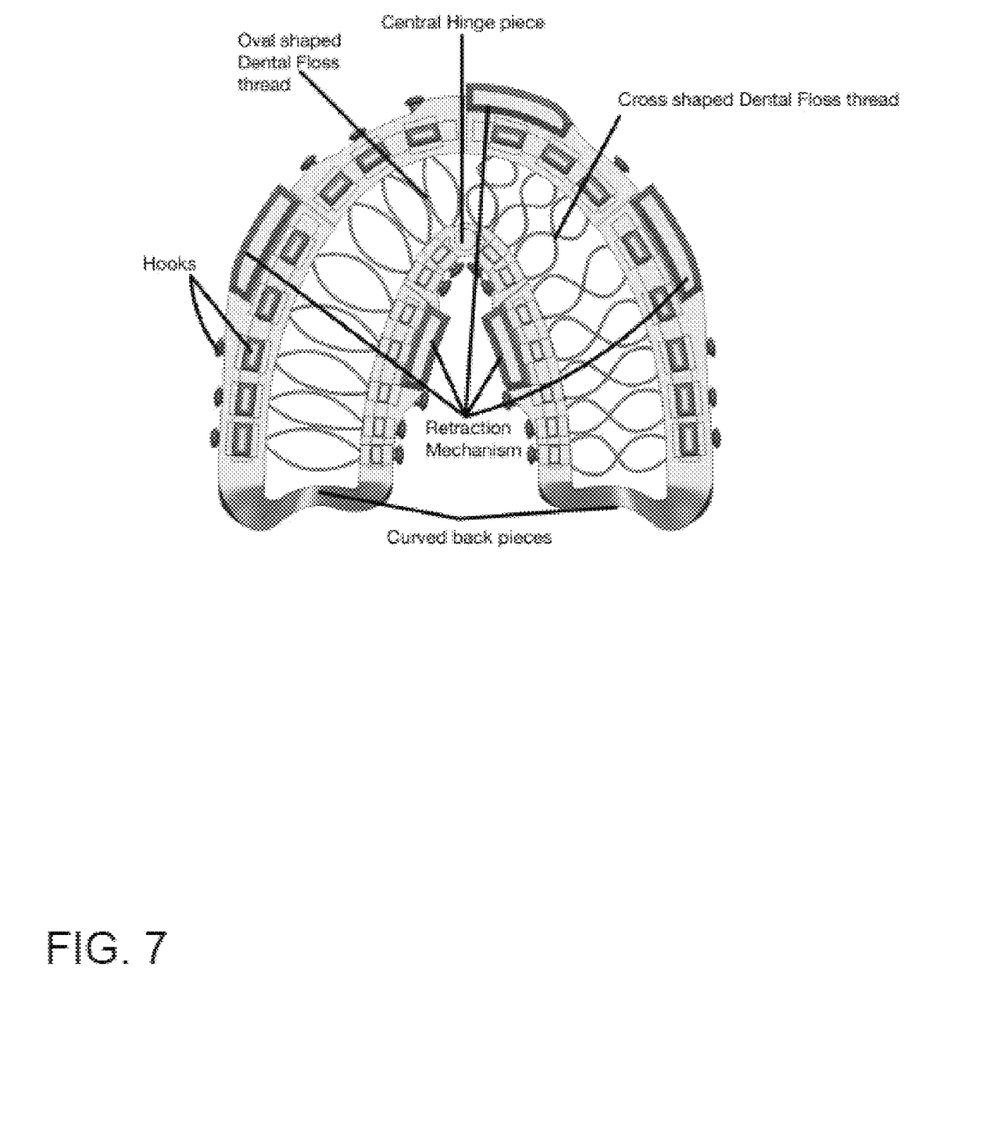

The embodiment of FIG. 7 is a disposable flossing appliance having a retraction mechanism to adjust the frame length and width. This embodiment comprises hooks extending from two different types of knobs. There are also two differently configured types of dental floss thread shapes. One shape is a crossing thread design (in the right side of the figure), and the other shape is an oval eye shaped design (in the left side of the figure). This frame embodiment comprises a hinge in the center of the inner arch that provides flexible movement. The back ends of the frame are curved to adapt the frame to fit on uneven surfaces in the mouth.

X-Shaped Thread Design

Figure 8:
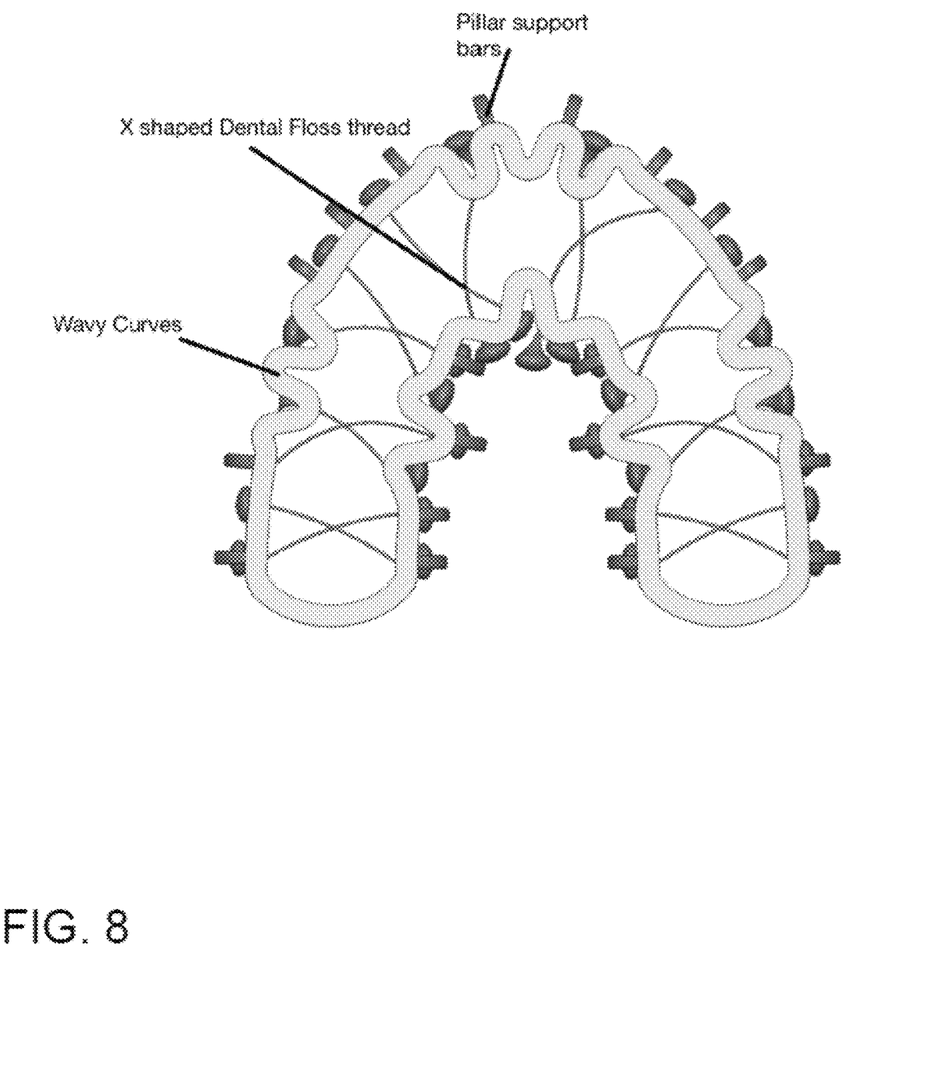

The embodiment of FIG. 8 comprises a frame in which X shaped threads are strung between inside and outside walls of the frame via hooks. The outside wall comprises bars to provide support for the structure of the frame. The wavy curves can expand and contract to modify the frame size to adapt to a wide variety of mouth shapes.

Simplest Disposable Frame

Figure 9:
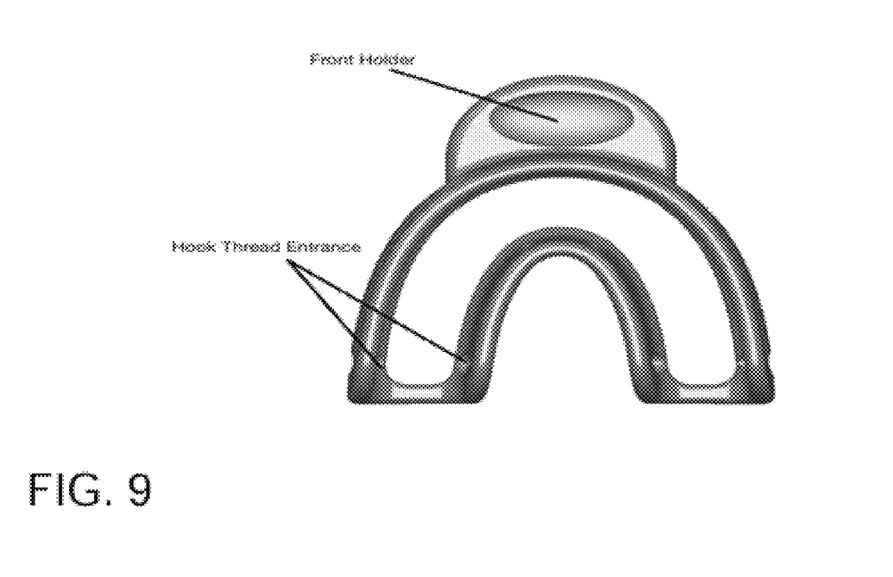

The embodiment of FIG. 9 is meant to be disposable as the frame. It has only a single part, comprising U-shaped frame with front and rear walls coupled together, and a front holder to aid in insertion and removal. Further, there are openings in the frame walls for hooks and threads. This is the simplest and slimmest design.

U Shaped Disposable Frame

Figure 10:
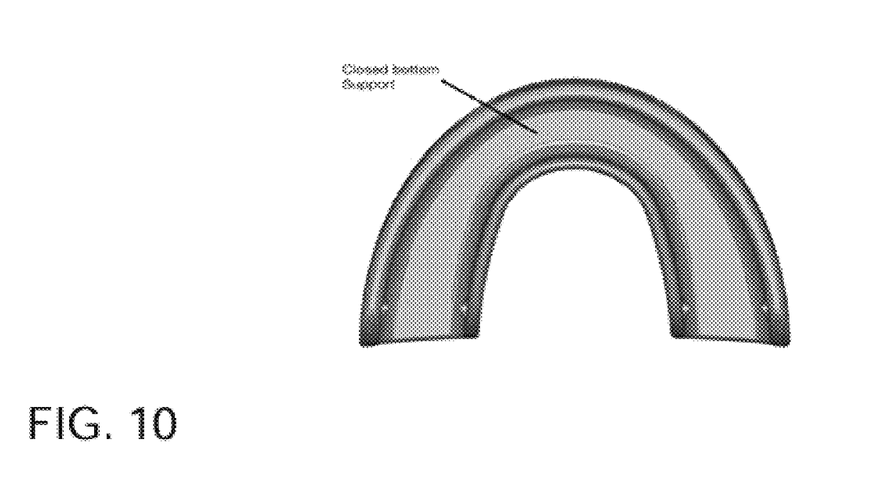

The embodiment of FIG. 10 is similar to that of FIG. 9 except it has no front holder, and has a closed bottom to provide more rigid support. Compared with the embodiment of FIG. 9, the outside wall of this embodiment is slightly more curved. The thick U-shaped design also provides a deeper bite.

Slanted Frame 1

Figure 11:
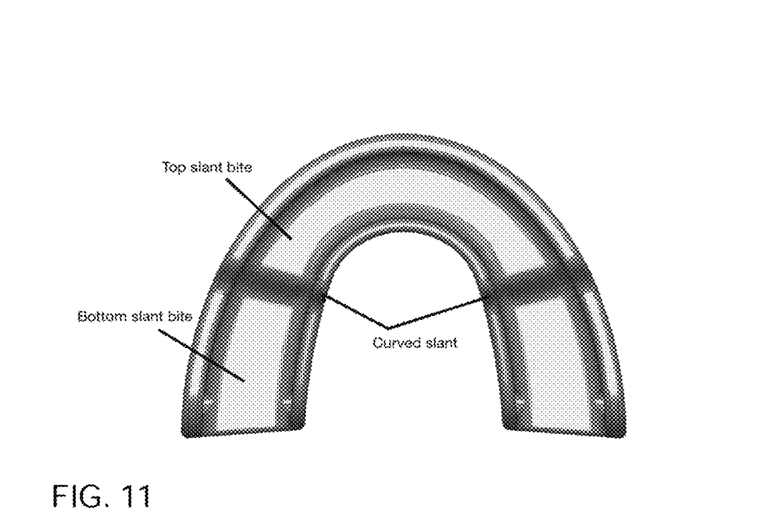

FIG. 11 shows an embodiment having a design having a curved slant in the middle of the left and right sides. This embodiment makes a division in the top & bottom part of the teeth.

Slanted Frame 2

Figure 12:
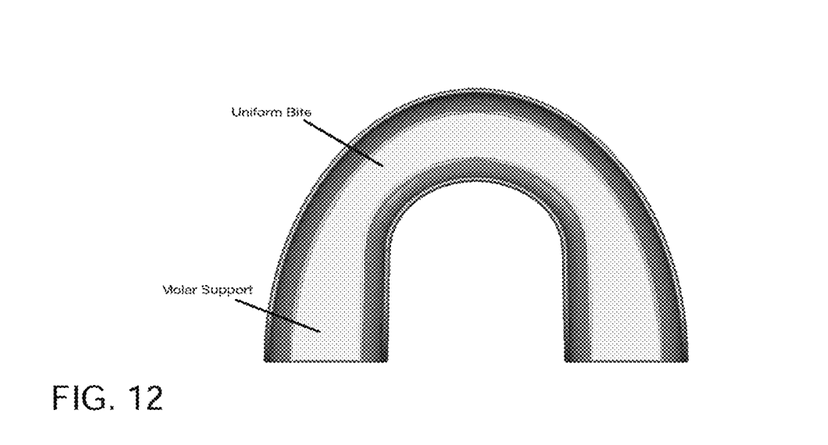

The embodiment of FIG. 12 has a uniform bite, but there is a slant towards the end molar region which provides molar support.

Ribbed Design Frame

Figure 13:
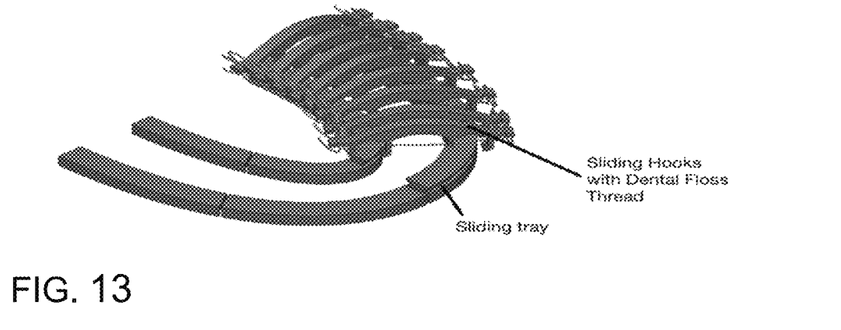

The embodiment of FIG. 13 has a plurality of ribs configured to slide along a track running along the outer outside and inside edges of the frame. Ribs may be added to and removed from the frame easily via the sliding tray. The frame also comprises retraction mechanisms to adjust both the width and the length of the frame.

Double Decker Design Frame

Figure 14:
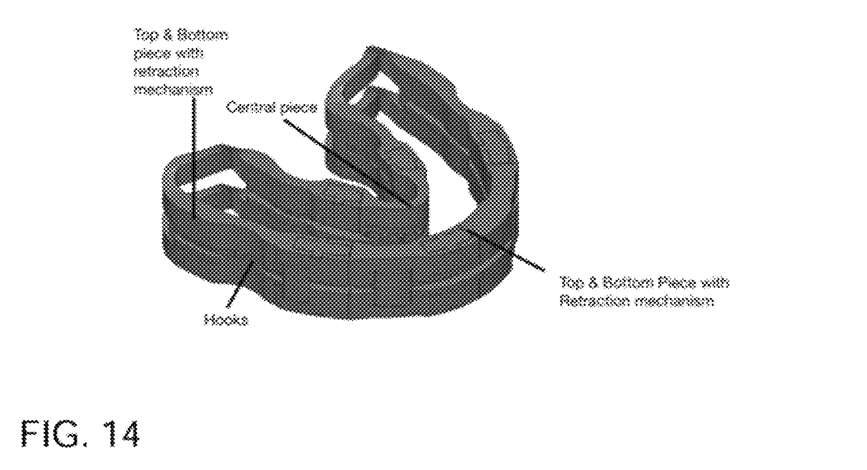

The embodiment of FIG. 14 comprises nine pieces, including four in the front of each of the top and the bottom, four in the back top and back bottom, and a single central piece in the middle that couples the top to the bottom. The middle piece may also be configured to act as a retraction mechanism. In this embodiment, the hooks are sandwiched between the upper lower parts.

Additional Embodiments

Electric-powered features like vibration, automation, and water nest may be added to one or more of the foregoing described embodiments, or to entirely new embodiments. Such embodiments are deemed to be included in the present claims, provided they otherwise fall within the scope of the claim language.

Further Features Various Embodiments May have in Common

Frames may be available in small, medium and large sizes.

Frames may have one or more mechanisms that allow the frames to be resized to provide a one size fits all solution.

Frames generally include 16 pairs dental floss threads as a floss network. The configuration of the floss network may vary, however.

Although the invention has been described and illustrated in exemplary forms with a certain degree of particularity, it is noted that the description and illustrations have been made by way of example only. Numerous changes in the details of construction, combination, and arrangement of parts and steps may be made without deviating from the scope of the invention. Accordingly, such changes are understood to be inherent in the disclosure. The invention is not limited except by the appended claims and the elements explicitly recited therein. The scope of the claims should be construed as broadly as the prior art will permit. It should also be noted that all elements of all of the claims may be combined with each other in any possible combination, even if the combinations have not been expressly claimed.

What is claimed is:

1. A dental floss appliance comprising:
   a U-shaped frame;
   a plurality of movable fasteners held by the frame; and
   a plurality of threads strung between the fasteners as dental floss sections,
   wherein the U-shaped frame comprises a front wall coupled to a rear wall by a left rear wall section attached to a left end of the front wall and the rear wall, and a right rear wall section attached to the right end of the front wall and the rear wall, the appliance further comprising:
   a left retraction slider extending from the left rear wall section;
   a left rear back piece configured to removably attach to the left retraction slider;
   a right retraction slider extending from the right rear wall section; and
   a left rear back piece configured to removably attach to the left retraction slider.

2. The appliance of claim 1,
   wherein each of the front wall and the rear wall has at least one groove or track; and
   wherein during use of the appliance, each of the plurality of movable fasteners is free to move along the groove or track to position the threads at the location of the interproximal spaces between adjacent teeth.

3. The appliance of claim 2, wherein each of the fasteners comprises a hook coupled to a hook base configured to freely slide along the groove or track.

4. The appliance of claim 2, wherein:
   the plurality of movable fasteners comprise two sets of 16 fasteners, including a first set of 16 fasteners disposed along the outer surface of the front wall, and a second set of 16 corresponding fasteners disposed along the outer surface of the rear wall.

5. The appliance of claim 4, wherein:
   the front wall and the rear wall both comprise a top section and a bottom section; and
   the top section is coupled to the bottom section with a plurality of arcuate braces disposed along the outside surface of both the top and bottom sections of the front wall and the rear wall, configured so that the moving fasteners may freely pass under the braces.

6. The appliance of claim 1, wherein adjacent ones of the threads are twisted together to form strands that, when the appliance is in use, adjust their position to be disposed at the location of the interproximal dental spaces of each pair of adjacent teeth.

7. The appliance of claim 1, further comprising a holder extending from the front outer surface of the frame, as an aid to insert the appliance into the mouth and floss the interproximal spaces between the teeth, and remove the appliance when done flossing.

8. The appliance of claim 1, further comprising at least one lock to hold at least one end of a length of floss threaded into the frame to provide the dental floss sections.

9. The appliance of claim 8, wherein the at least one lock keeps the dental floss sections taut.

10. The appliance of claim 1, wherein the front wall and the rear wall both comprise a top section and a bottom section; the appliance further comprising:
a plurality of protrusions extending from one of the top section and the bottom section; and
a plurality of indentations located at positions on the other of the top section and the bottom section, the positions of the indentations corresponding to respective positions of the protrusions, the protrusions and corresponding indentations being configured to snap together to removably couple the top section to the bottom section.

11. The appliance of claim 1, wherein:
the left and right rear wall sections are curved so the frame adapts to fit on uneven surfaces in the mouth of a user; and
two different fastener configurations are used to hold dental floss section ends configured to form two different dental floss section shapes, including a shape in which adjacent sections form a cross, and a shape in which adjacent sections form an oval.

12. The appliance of claim 1, wherein the U-shaped frame comprises a U-shaped bottom having a front edge and a rear edge, permanently coupled at the front edge orthogonally to a bottom edge of the front wall and coupled at its rear edge orthogonally to a bottom edge of the rear wall.

13. The appliance of claim 1, wherein the U-shaped frame has a curved slant in a middle of each side.

14. The appliance of claim 1, wherein the appliance has dimensions that are one of:
a small appliance sized for use by a child;
a medium appliance with a length and a width larger than those of the small appliance; and
a large appliance with a length and a width larger than those of the medium appliance.

15. A dental floss appliance comprising:
a U-shaped frame, wherein the U-shaped frame comprises a front wall coupled to a rear wall by a left rear wall section attached to a left end of each of the front wall and the rear wall, and a right rear wall section attached to the right end of each of the front wall and the rear wall,
wherein each of the front wall and the rear wall has at least one groove or track, and
a plurality of movable fasteners held by the frame; and
a plurality of threads strung between the fasteners as dental floss sections, wherein the plurality of movable fasteners comprise two sets of 16 fasteners, including a first set of 16 fasteners disposed along the outer surface of the front wall, and a second set of 16 corresponding fasteners disposed along the outer surface of the rear wall;
wherein during use of the appliance, each of the plurality of movable fasteners are free to move along the groove or track to position the threads at the location of the interproximal spaces between adjacent teeth.

16. A dental floss appliance comprising:
a U-shaped frame, wherein the U-shaped frame comprises a front wall coupled to a rear wall by a left rear wall section attached to a left end of each of the front wall and the rear wall, and a right rear wall section attached to the right end of each of the front wall and the rear wall,
wherein each of the front wall and the rear wall has at least one groove or track, and
a plurality of movable fasteners held by the frame; and
a plurality of threads strung between the fasteners as dental floss sections, wherein each of the fasteners comprises a hook coupled to a hook base configured to freely slide along the groove or track;
wherein during use of the appliance, each of the plurality of movable fasteners are free to move along the groove or track to position the threads at the location of the interproximal spaces between adjacent teeth.

* * * * *